United States Patent [19]

Furuse et al.

[11] Patent Number: 5,179,328
[45] Date of Patent: Jan. 12, 1993

[54] POWER SEAT APPARATUS

[75] Inventors: Takahisa Furuse; Mitsuo Yokoyama, both of Yokohama, Japan

[73] Assignee: Jidosha Denki Kogyo K.K., Kanagawa, Japan

[21] Appl. No.: 669,693

[22] Filed: Mar. 14, 1991

[30] Foreign Application Priority Data

Mar. 16, 1990 [JP] Japan .................. 2-66493
May 11, 1990 [JP] Japan .................. 2-122257

[51] Int. Cl.$^5$ .................. G05B 5/00; G05B 19/28
[52] U.S. Cl. .................. 318/603; 318/466; 318/467; 318/568.1; 318/468; 180/287; 379/12
[58] Field of Search ............ 318/467, 466, 280, 286, 318/560-630; 379/12; 307/10 R; 180/287, 102; 361/167, 23-28

[56] References Cited

U.S. PATENT DOCUMENTS

| | | | |
|---|---|---|---|
| 3,597,554 | 8/1971 | Siegal | 318/466 X |
| 3,599,179 | 8/1971 | Arnold | |
| 3,935,919 | 2/1976 | Kawamura et al. | 307/105 B |
| 4,001,777 | 1/1977 | Alexander | 180/102 X |
| 4,138,706 | 2/1978 | Johnson et al. | 361/42 |
| 4,401,928 | 8/1983 | Kamijo et al. | 318/466 |
| 4,404,632 | 9/1983 | Harada et al. | 318/466 X |
| 4,467,252 | 8/1984 | Takeda et al. | 318/603 |
| 4,510,426 | 4/1985 | Michaels et al. | 318/565 |
| 4,706,194 | 11/1987 | Webb et al. | 318/466 |
| 4,766,356 | 8/1988 | Handa et al. | 318/55 |
| 4,797,824 | 1/1989 | Sugiyama et al. | 318/467 |
| 4,808,897 | 2/1989 | Saito et al. | 318/466 X |
| 4,809,180 | 2/1989 | Saitoh | 318/466 X |
| 4,845,620 | 7/1989 | Parker | 318/466 X |
| 4,853,687 | 8/1989 | Isomura et al. | 318/466 X |
| 4,918,360 | 4/1990 | Tanaka et al. | 318/41 |
| 4,997,053 | 3/1991 | Drori et al. | 180/287 |
| 5,001,741 | 3/1991 | Sayer | 379/12 |

Primary Examiner—Paul Ip
Attorney, Agent, or Firm—Sughrue, Mion, Zinn, Macpeak & Seas

[57] ABSTRACT

A power seat apparatus which comprises motors for moving a seat in respective direction, relays for changing rotational directions of the respective motors, a preset memory for memorizing a seat position suitable for respective drivers, a memory drive circuit for driving the motors so as to move the seat into the memorized position automatically according to data memorized in the preset memory, a manual drive circuit for driving the motors according to an operation of a manual switch and a control mechanism. The control mechanism detects the contact fault in the relays, or controls the motors accurately by counting the number of inertial rotations as a proper directional rotation without misjudgement even if the manual switch is operated in the reverse direction when the motors are driven automatically in one direction.

2 Claims, 9 Drawing Sheets

POWER SEAT APPARATUS

BACKGROUND OF THE INVENTION

1. Field of the Invention

This invention relates to a motor driven seat apparatus used for an automobile, for example, and more particularly to a power seat apparatus which is possible to adjust a seat automatically in suitable positions, heights and reclining angles of the seat backs memorized in a memory means for respective drivers individualy.

2. Description of the Prior Art

Heretofore, there has been used a power seat apparatus as shown in FIG. 7, for example.

Namely, the power seat apparatus is provided with a slide-motor for sliding a seat in a front or rear direction, a lift-motor for driving the seat up or down, and a recliner-motor for adjusting a reclining angle of a seat back of the seat, the slide-motor part is only shown in FIG. 7 among the aforementioned motors.

A power terminal $101a$ of the slide-motor $101$ is connected with a travelling contact $rl_{1\text{-}1}$ of a relay $RL_1$, and a normal-close side fixed contact $rl_{1\text{-}2}$ of the relay $RL_1$ is connected with a power source $50$ and a relay coil $rl_1$ of the relay $RL_1$.

The relay coil $rl_1$ of the relay $RL_1$ is connected to a fixed contact $SW_{1\text{-}2}$ of a front-side manual switch $SW_1$ having a movable contact $SW_{1\text{-}1}$ grounded, and connected to a port $102a$ of a controller $102$ and to the collector of a transistor $Tr_1$.

A normal-open side fixed contact $rl_{1\text{-}3}$ of the relay $RL_1$ and the emitter of the transistor $Tr_1$ are grounded and the base of the transistor $Tr_1$ is connected to the port $102b$ of the controller $102$.

Another power terminal $101b$ of the slide-motor $101$ is connected to a travelling contact $rl_{2\text{-}1}$ of a relay $RL_2$, and a normal-close side fixed contact $rl_{2\text{-}2}$ of the relay $RL_2$ is connected to the power source $50$ and a relay coil $rl_2$ of the relay $RL_2$.

Furthermore, the relay coil $rl_2$ of the relay $RL_2$ is connected to a fixed contact $SW_{2\text{-}2}$ of a rear-side manual switch $SW_2$ having a grounded movable contact $SW_{2\text{-}1}$, and connected to a port $102c$ of the controller $102$ and the collector of a transistor $TR_2$.

A normal-open side fixed contact $rl_{2\text{-}3}$ of the relay $RL_3$ and the emitter of the transister $Tr_2$ are grounded, and the base of the transister $Tr_2$ is connected to a port $102d$ of the controller $102$.

The controller $102$ is provided with a microcomputer in which signals are input from a switch board (not shown) through an interface circuit.

In a case of memorizing a seat position suitable for a driver, the switch board is operated preparatively in the first place. Subsequently, the slide-motor $101$ is driven in the front or rear direction by operating the front-side manual switch $SW_1$ or the rear side manual switch $SW_2$ and stopped at the seat position suitable for the driver.

By the setting operation of the switch board in this state, the microcomputer detects the positional displacement by counting the number of rotations (pulses) of the slide-motor $101$ until the seat arrives at the present position, and the seat position is memorized according to the number of rotations of the slide-motor $101$.

After this, it is possible to drive the slide-motor $101$ automatically by the one-touch operation of the switch board until the seat arrives to the seat position memorized by the microcomputer wherever the seat may be.

If the front-side manual switch $SW_1$ or the rear-side manual switch $SW_2$ is changed on when the slide-motor $101$ is driven automatically according to the data memorized in the microcomputer, output from the microcomputer to the slide-motor $101$ is discontinued and output from the aforementioned manual switch $SW_1$ or $SW_2$ is given priority to the output from the microcomputer.

In the conventional power seat apparatus described above, in a case where the rear-side manual switch $SW_2$, happens to be switched on for some reason when the slide-motor $101$ is driven automatically in the front direction toward the position memorized by the microcomputer, for example, both power terminals $101a$ and $101b$ of the slide-motor $101$ are grounded, so that the motor $101$ is stopped by the dynamic braking, but rotates slightly by inertia after the dynamic braking.

At this time, the controller $102$ judges the slide-motor $101$ to rotate in the rear direction incorrectly in spite of the fact that the slide-motor $101$ rotates in the front direction by inertia at the same time of changing on the rear-side manual switch $SW_2$ because the controller $102$ detects the number of rotations of the slide-motor $101$ by the pulse transformation and the judgement of the rotational direction of the slide-motor $101$ is done on basis of the detection.

Accordingly, there is a discrepancy between the seat position and the memorized number of rotations of the slide-motor $101$ because the controller $102$ counts the number of rotations while the slide-motor $101$ rotates by inertia as a pulse in the opposite direction. Therefore, there is a problem since it is not possible to drive the seat properly to the position memorized suitably for the driver.

Furthermore, in the conventional power seat apparatus, if a contact fault occurs in the relay $RL_1$ and the manual-open side fixed contact $rl_{1\text{-}3}$ sticks fusingly to the movable contact $rl_{1\text{-}1}$, for example, the slide-motor $101$ is driven in the front direction in spite of off-operation of the front-side manual switch $SW_1$. In such a case, it is possible to stop temporarily the slide-motor $101$ by on-operation of the rear-side manual switch $SW_2$ so as to cut off the power supply to the slide-motor $101$, but the slide-motor $101$ rotates again in the front direction by discontinuing the on-operation of the rear-side manual switch $SW_2$. Therefore, there is another problem since abnormality in the apparatus can not be recognized by the driver until the seat is driven by the slide-motor $101$.

SUMMARY OF THE INVENTION

This invention is made in view of the above-mentioned problems of the prior art. It is an object to provide a power seat apparatus which is possible to drive a seat automatically and accurately into the position memorized suitably for the respective driver individualy without misjudging the rotational direction during inertial rotation. And another object of this invention is to provide a power seat apparatus which is possible to warn the driver of a trouble in the apparatus by detecting the contact fault of a relay and possible to control motors according to a situation of the relay.

The construction of the power seat apparatus according to an aspect of this invention in order to accomplish the above-mentioned object characterized by comprising a slide-motor for sliding a seat in a front or rear direction, a lift-motor for driving the seat up or down, a recliner-motor for adjusting a reclining angle of a seat back of the seat, a preset memory means for storing operation data of said respective motors in response to a preset operation, a memory drive means for driving the motor according to the operating data stored in the preset memory means, a manual drive means for driving the motors according to an operation of a manual switch means, and a control mechanism for controlling the motors by processing the operating data output from the respective motors during their inertial rotations as signals in the same direction as just before the inertial rotations of the respective motors in a case of operating the manual switch means when the motors are driven by the memory drive means.

The construction of the power seat apparatus according to another aspect of this invention in order to accomplish another object comprises a slide-motor for sliding a seat in a front or rear direction, a lift-motor for driving the seat up or down, a recliner-motor for adjusting a reclining angle of a seat back of the seat, a preset memory means for storing operating data of the respective motors in response to a preset operation, a memory drive means for driving the motors according to the operating data stored in the preset memory means, a manual driving means for driving the motors according to an operation of a manual switch means, a relay for changing a direction of electric current to be supplied for said respective motors, and a control mechanism for giving a warning through a warning means and controlling the motors according to a situation of the relay in a case of detecting a contact fault in said relay.

DESCRIPTION OF THE PREFERRED EMBODIMENT

A power seat apparatus according to an embodiment of this invention will be explained below on basis of FIG. 1 to FIG. 3.

Figure 1:
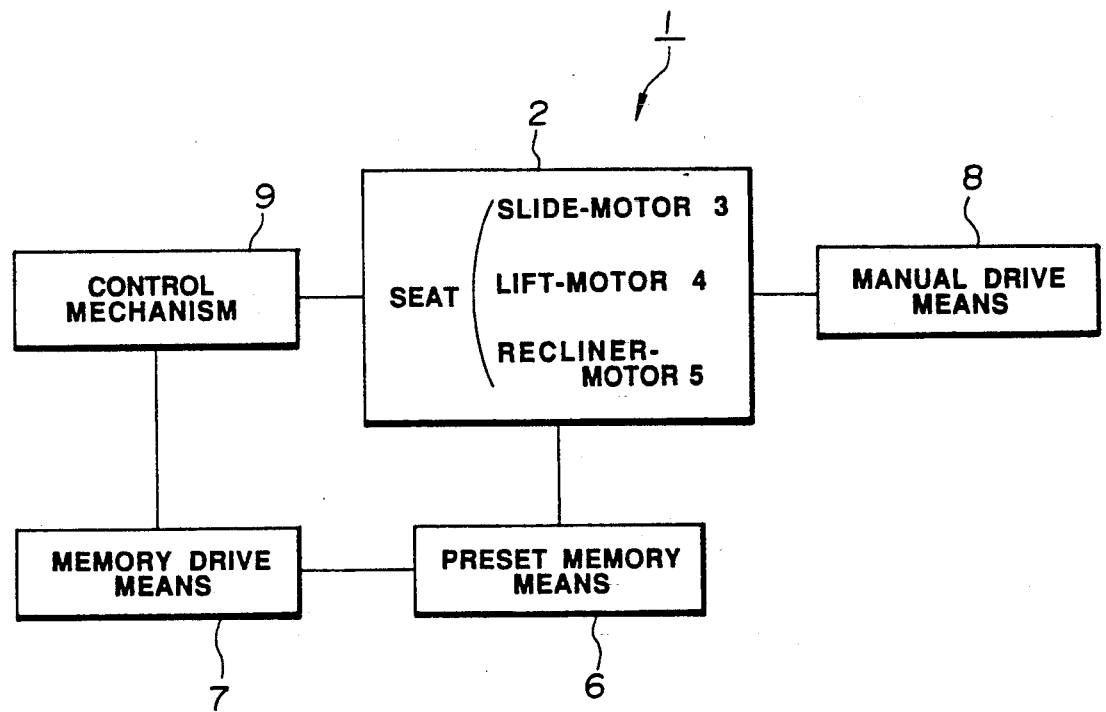
FIG. 1 is a block diagram showing the construction of the power seat apparatus according to an embodiment of this invention.

A power seat apparatus 1 shown in FIG. 1 is provided with a seat 2 having a slide-motor 3 for sliding the seat 2 in a front or rear direction, a lift-motor 4 for driving the seat 2 up or down and a recliner-motor 5 for adjusting a reclining angle of a seat back, and a preset memory means 6 for storing operating data of the respective motors 3, 4 and 5 in response to a preset operation of a memory switch on a switch board (not shown)

The power seat apparatus 1 is provided with a memory drive means 7 for driving the respective motors 3, 4 and 5 according to the operating data stored in the preset memory means 6 and a manual drive means 8 for driving the respective motors 3, 4 and 5.

Furthermore the power seat apparatus 1 is provided with a control mechanism 9 including a microcomputer having a timer and for controlling the respective motors by processing the operating data output from the motors during their inertial rotations as signals in the same directions as just before the inertial rotations of the respective motors in a case of operating the manual switch means when the motors are driven by the memory drive means 7.

Figure 2:
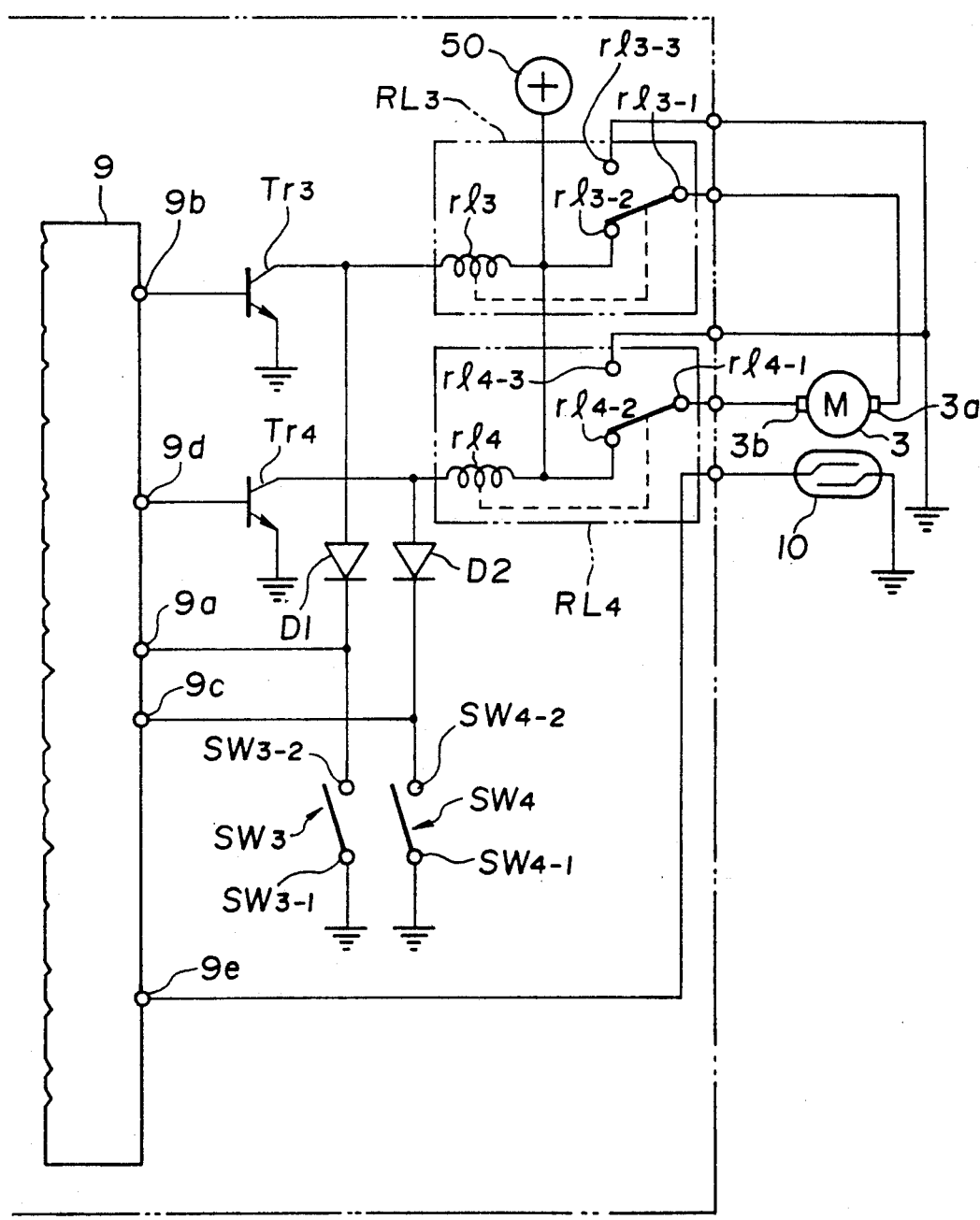
FIG. 2 is a circuit configuration of the slide-motor of the power seat apparatus shown in FIG. 1.

FIG. 2 is a circuit diagram of the slide-motor 3 among the respective motors 3, 4 and 5, the lift-motor 4 and the recliner-motor 5 have also circuit configurations similar to that shown in FIG. 2.

A power terminal $3a$ of the slide-motor 3 is connected to a travelling contact $rl_{1-3}$ of a relay $RL_3$, and a normal-close side fixed contact $rl_{3-2}$ of the relay $RL_3$ is connected to a power source 50 and a relay coil $rl_3$ of the relay $RL_3$.

The relay coil $rl_3$ of the relay $RL_3$ is connected to a fixed contact $SW_{3-2}$ of a front-side manual switch $SW_3$ which forms a part of the manual switch means and has a movable contact $SW_{3-1}$ grounded through a diode $D_1$ and connected to the collector of a transistor $Tr_3$, and a junction point between the diode $D_1$ and the fixed contact $SW_{3-2}$ is connected to a front-side manual input port $9a$ of a control mechanism 9.

A normal-open side fixed contact $rl_{3-3}$ of the relay $RL_3$ and the emitter of the transister $Tr_3$ are grounded, and the base of the transistor $Tr_3$ is connected to a front-side output port $9b$ of the control mechanism 9.

Another power terminal $3b$ of the slide motor 3 is connected to a travelling contact $rl_{4-1}$ of a relay $RL_4$, and a normal-close side fixed contact $rl_{4-2}$ of the relay $RL_4$ is connected to the power source 50.

A relay coil $rl_4$ of the relay $RL_4$ is connected to a fixed contact $SW_{4-2}$ of a rear-side manual switch $SW_4$ which forms another part of the manual switch means and has a movable contact $SW_{4-1}$ grounded through a diode $D_2$ and connected to the collector of a transistor $Tr_4$, and a junction point between the diode $D_2$ and the fixed cotact $SW_{4-2}$ is connected to a rear-side manual input port $9c$ of the control mechanism 9.

Furthermore, a normal-open side fixed contact $rl_{4-3}$ of the relay $RL_4$ and the emitter of the transistor $Tr_4$ are grounded, and the base of the transistor $Tr_4$ is connected to a rear-side output port $9d$ of the control mechanism 9.

The control mechanism 9 is designed so as to be input a signal from the preset memory means 6 through an input-output interface (not shown) and a signal for driving the slide-motor 3 according to the operating data stored in the preset memory means 6.

The control mechanism 9 is provided with a sensor-input port $9e$ to be input with data detected by a rotation sensor 10 which detects a rotational pulse of the motor 3.

In a case of memorizing a seat position suitable for a driver, by operating the front-side manual switch $SW_3$ or the rear-side manual switch $SW_4$ the slide-motor 3 is driven in the front or rear direction after operating a set switch (not shown) on the switch board, and the slide-motor 3 is stopped at the seat position suitable for the driver.

The seat position is memorized in the preset memory means 6 by the preset operation of the memory switch on the switch board in this state.

After this, it is possible to drive the slide-motor 3 automatically until the seat 2 arrives to the seat position memorized in the preset memory means 6 by autopositioning operation of the memory switch on the switch board through the memory drive means 7.

Figure 3A:
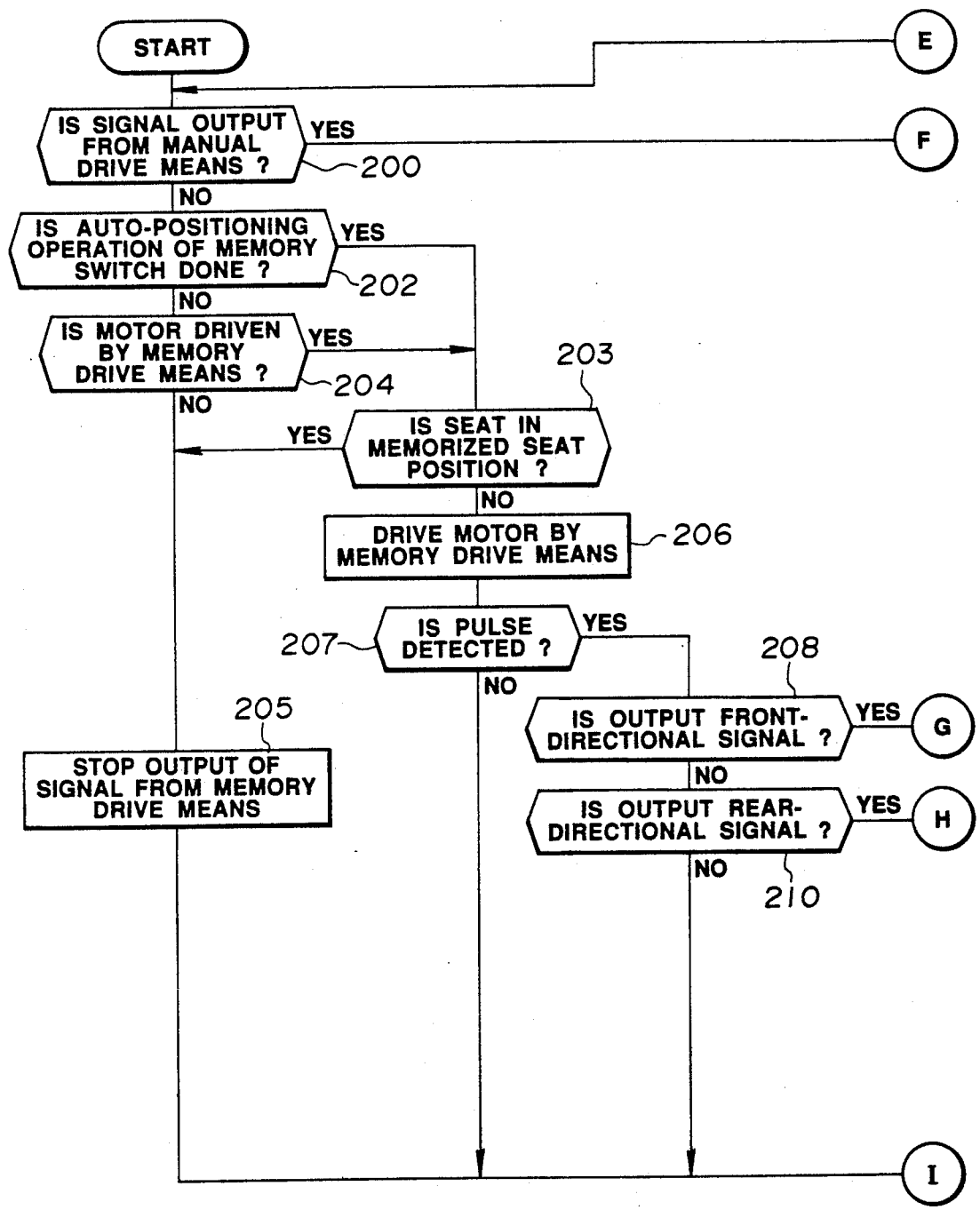
FIG. 3A and 3B are flow chart explaining control in the power seat apparatus shown in FIG. 1.
Figure 3B:
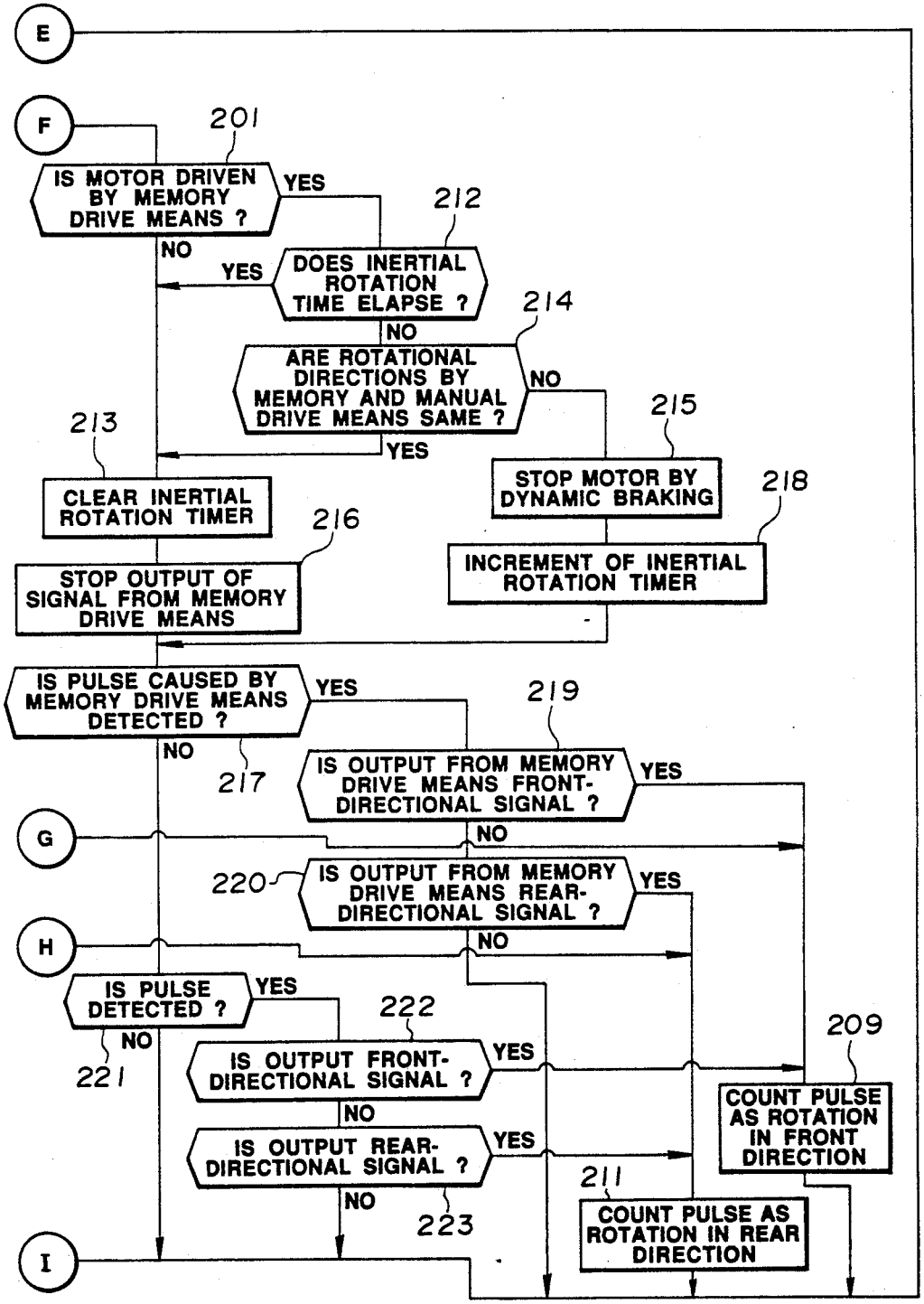

When the front-side manual switch SW₃ or the rear-side manual switch SW₄ are changed on in this state, the control mechanism 9 excutes following control as shown in FIG. 3.

Namely, the control is started by on-operation of a power switch (not shown), judgement is done as to whether a signal is output from the manual drive means 8 or not at step 200.

In step 200, if the signal is output from the manual drive means 8 (YES), control proceeds to step 201, and when the signal is not output (NO), control proceeds to step 202.

In step 202 to which control proseeds by judging that the signal is not output from the manual drive means 8 (NO) at step 200, judgement is done as to whether auto-positioning operation of the memory switch is done or not.

In step 202, if the auto-positioning operation of the memory switch is done (YES), control proceeds to step 203, or proceeds to step 204 when the auto-positioning operation is not done (NO).

In step 204, judgement is done as to whether the motor 3 is driven by the memory drive means 7 or not, if the motor 3 is being driven by the memory drive means 7 (YES), control proceeds to step 203, when the motor 3 is not being driven by the memory drive means 7 (NO) in step 204, control proceeds to succeeding step 205.

In step 203, judgement is done as to whether the seat 2 is in the seat position memorized by the preset memory means 6 or not. If the seat 2 is judged to be in the memorized seat position (YES), the output of the signal from the memory drive means 7 is discontinued at succeeding step 205, and control returns to step 200. When the seat 2 is judged not to be in the memorized seat position (NO), the motor 3 is driven by the memory drive means 7 at succeeding step 206 and control proceeds to step 207.

In step 207, judgement is done as to whether or not a pulse is detected by the rotation sensor 10, that is whether the motor 3 rotates or not. If the pulse is detected (YES), control proceeds to step 208. When the pulse is not detected (NO), control returns to step 200.

In step 208, judgement is done as to whether output from the memory drive means 7 is a front-directional signal or not if the output from the memory drive means 7 is judged to be the front-directional signal (YES), the number of pulses is counted as rotation in the front direction at succeeding step 209 and control returns to step 200. When the output is judged not to be the front-directional signal (NO), control proceeds to step 210.

In step 210, judgement is done as to whether the output from the memory drive means 7 is a rear-directional signal or not. If the output from the memory drive means 7 is judged to be the rear-directional signal (YES), the number of pulses is counted as rotation in the rear direction at succeeding step 211 and control returns to step 200. When the output is judged not to be the rear-directional signal (NO), control returns to step 200.

On the other side, judgement is done as to whether the motor 3 is driven by the memory drive means 7 or not at step 201. If the motor 3 is driven by the memory drive means 7 (YES), control proceeds to step 212. When the motor 3 is judged not to be driven, control proceeds to step 213.

Namely, when the signal is output from the manual drive means 8 by operating the manual switch means at step 200 and the motor 3 is not driven by the memory drive means 7 (NO) at step 201, an inertial rotation timer is cleared at step 213 which is predetermined by estimating the time required for the rotation of the motor 3 by inertia, and the output from the memory drive means 7 is discontinued at succeeding step 216 and control proceeds to step 217.

In step 217, judgement is done as to whether a pulse caused by the rotation of the motor 3 according to the memory drive means 7 is detected or not, and control proceeds to step 221 because the motor 3 is not driven by the memory drive means 7 and it is not a pulse caused by the memory drive means 7 even if the pulse is detected at step 217.

In step 221, judgement is done as to whether a pulse is detected or not. If the pulse is not detected (NO), control returns to step 200.

When the pulse is detected (YES) at step 221, judgement is done as to whether output from the manual drive means 8 is a front-directional signal or not at step 222. If the output from the manual drive means 8 is judged to be the front-directional signal (YES), the number of pulses is counted as rotation in the front direction at step 209 and control returns to step 200. When the output is judged not to be the front-directional signal (NO) at step 222, control proceeds to step 223 and the number of pulses is counted as rotation in the rear direction at step 211 and control returns to step 200 if the output is judged to be the rear-directional signal (YES) at step 223.

If the motor 3 is judged to be driven by the memory drive means 7 at step 201 at the time of operating the manual switch means, control proceeds to step 212 and judgement is done as to whether the time predetermined by the inertial rotation timer elapses or not. Control proceeds to step 214 and judgement is done as to whether the rotational direction driven by the memory drive means 7 and the rotational direction driven by the manual drive means 8 are the same or not because the inertial rotation time set by the inertial rotation timer does not yet elapse in the early stage of the execution of step 212.

In step 214, if the rotational directions driven by the memory drive means 7 and the manual drive means 8 are judged to be the same (YES), control proceeds to step 217 through the aforementioned steps 213 and 216. Control proceeds to step 221 by judging the pulse not to be caused by the rotation according to the memory drive means 7 even if the pulse is detected at step 217 because the output from the memory drive means 7 is discontinued at step 216 and control proceeds to step 221. Control returns to step 200 directly or after counting the number of pulses as rotation in the front or rear direction on basis the judgements at steps 221, 222 and 223 as mentioned above.

When the rotational directions are judged not to be the same (NO) at step 214, the motor 3 is stopped by the dynamic breaking at step 215 by actuating the transistors Tr₃ and Tr₄ with outputs from the output ports 9b and 9c of the control mechanism 9, and exciting the relay coils rl₃ and rl₄ of the relay RL₃ and RL₄ at the same time. Control proceeds to step 217 after the increment of the inertial rotation timer at step 218. At this time, if the pulse is detected at step 217, control proceeds to step 219 by judging the pulse to be caused by the rotation according to the memory drive means 7

(YES) because the motor 3 is driven by the memory drive means 7 as judged at step 201. Control proceeds to step 219, judgement is done as to whether output from the memory drive means 7 is a front-directional signal or not. If the output from the memory drive means 7 is judged to be the front-directional signal (YES), the number of pulses is counted as rotation in the front direction at step 209 and control returns to step 200. When the output is judged not to be the front-directional signal (NO) at step 219, control proceeds to step 220, and the number of pulses is counted as rotation in the rear direction at step 211 and then control returns to step 200 if the output is judged to be the rear-directional signal (YES) at step 200. When the pulse is not detected at step 217, control returns to step 200 after judgement (NO) at step 221.

The aforementioned processes after step 214 are repeated until the predetermined inertial rotation time expires at step 212.

When the inertial rotation time is judged to elapse at step 212, control proceeds to step 221 through the processes at steps 213 and 216 and the judgement (NO) at step 217. Judgement is done as to whether a pulse is detected or not. If the pulse is not detected (NO), control returns to step 200. When the pulse is detected (YES) at step 221, judgement is done as to whether output from the manual drive means 8 is a front-directional signal or not at step 222. If the output from the manual drive means 8 is judged to be the front-directional signal (YES), the number of pulses counted as rotation in the front direction at step 209 and control returns to step 200. When the output is judged not to be the front-directional signal (NO) at step 222, control proceeds to step 223 and the number of pulses is counted as rotation in the rear direction at step 211 and control returns to step 200 if the output is judged to be the rear-directional signal (YES) at step 223.

Namely, in the case of operating the manual switch means in one direction while the motor 3 is driven automatically in the opposite direction by the memory drive means 7, the power seat apparatus 1 according to this embodiment is so designed that the control mechanism 9 counts the number of pulses caused by the rotation of the motor 3 as rotation in the direction directed by the memory deive means 7 considering that the motor 3 rotates by inertia until the predetermined inertial rotation time elapses, and counts the number of the pulse as rotation in the direction directed by the manual drive means 8 considering that the motor 3 does not rotate by inertia any longer after the predetermined inertial rotation time elapses.

A power seat apparatus according to another embodiment of this invention will be described below on basis of FIG. 4 to FIG. 6.

Figure 4:
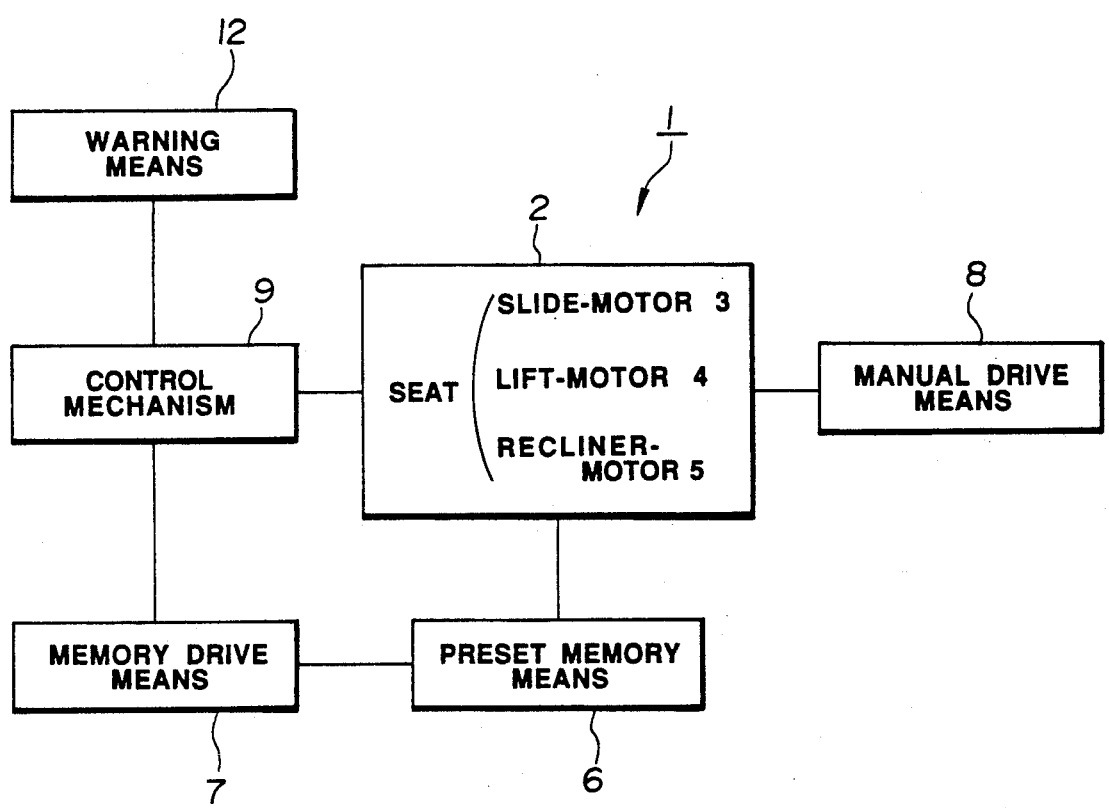
FIG. 4 is a block diagram showing the construction of the power seat apparatus according to another embodiment of this invention.

A power seat apparatus 1 shown in FIG. 4 has a similar construction to that shown in FIG. 1 with the exception of a warning means 12.

In the power seat apparatus 1 of this embodiment, the control mechanism 9 has a function to give a warming through the warning means 12, and to control the motors 3, 4 and 5 according to situations of the relays for changing directions of electric current to be sipplied for the respective motors 3, 4 and 5 in a case of detecting a contact fault in the relays.

Figure 5:
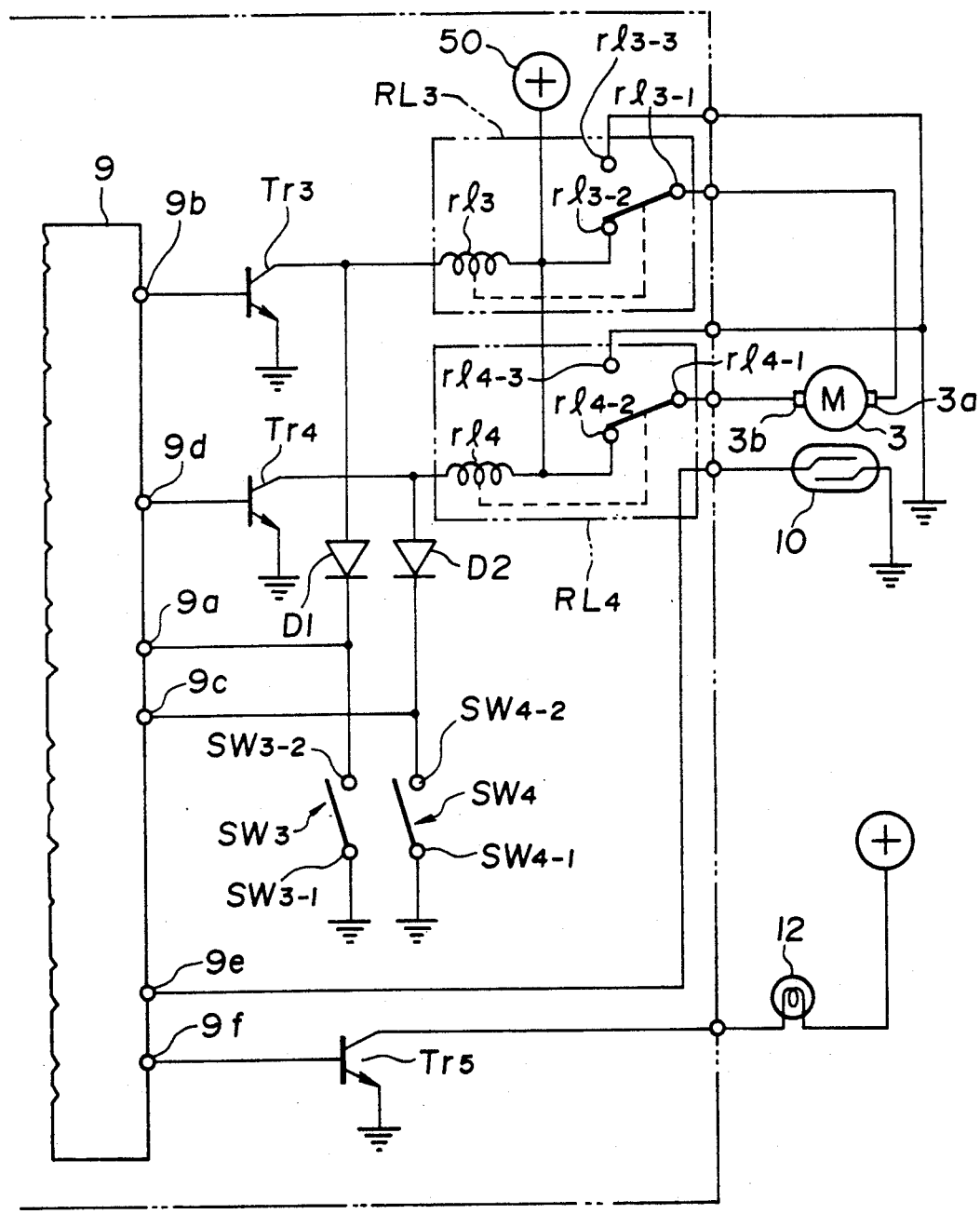
FIG. 5 is a circuit configuration of the slide-motor of the power seat apparatus shown in FIG. 4.

FIG. 5 is a circuit diagram of the slide-motor 3 of the power seat apparatus 1, which has a similar circuit configuration to that shown FIG. 2 with the exception of the warning means 12. Namely, the warning means 12 is connected to a warning signal output port 9f of the control mechanism 9 through a transistor $TR_5$.

Also in the power seat apparatus 1 in this embodiment, it is possible to memorize the seat position suitable for a driver by the similar procedure as described in the first embodiment.

Figure 6A:
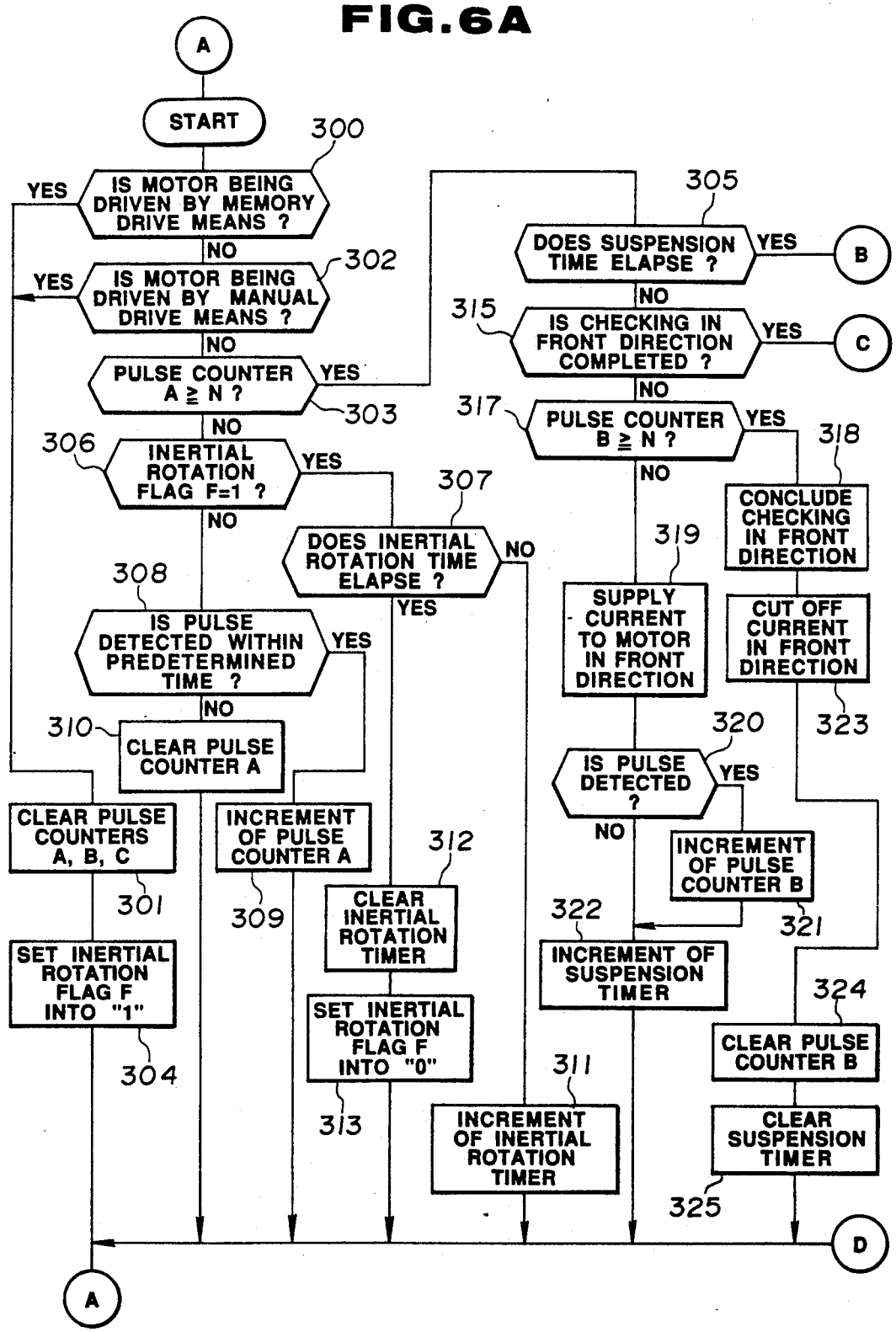
FIGS. 6A and 6B are flow chart explaining control in the power seat apparatus shown in FIG. 4.
Figure 6B:
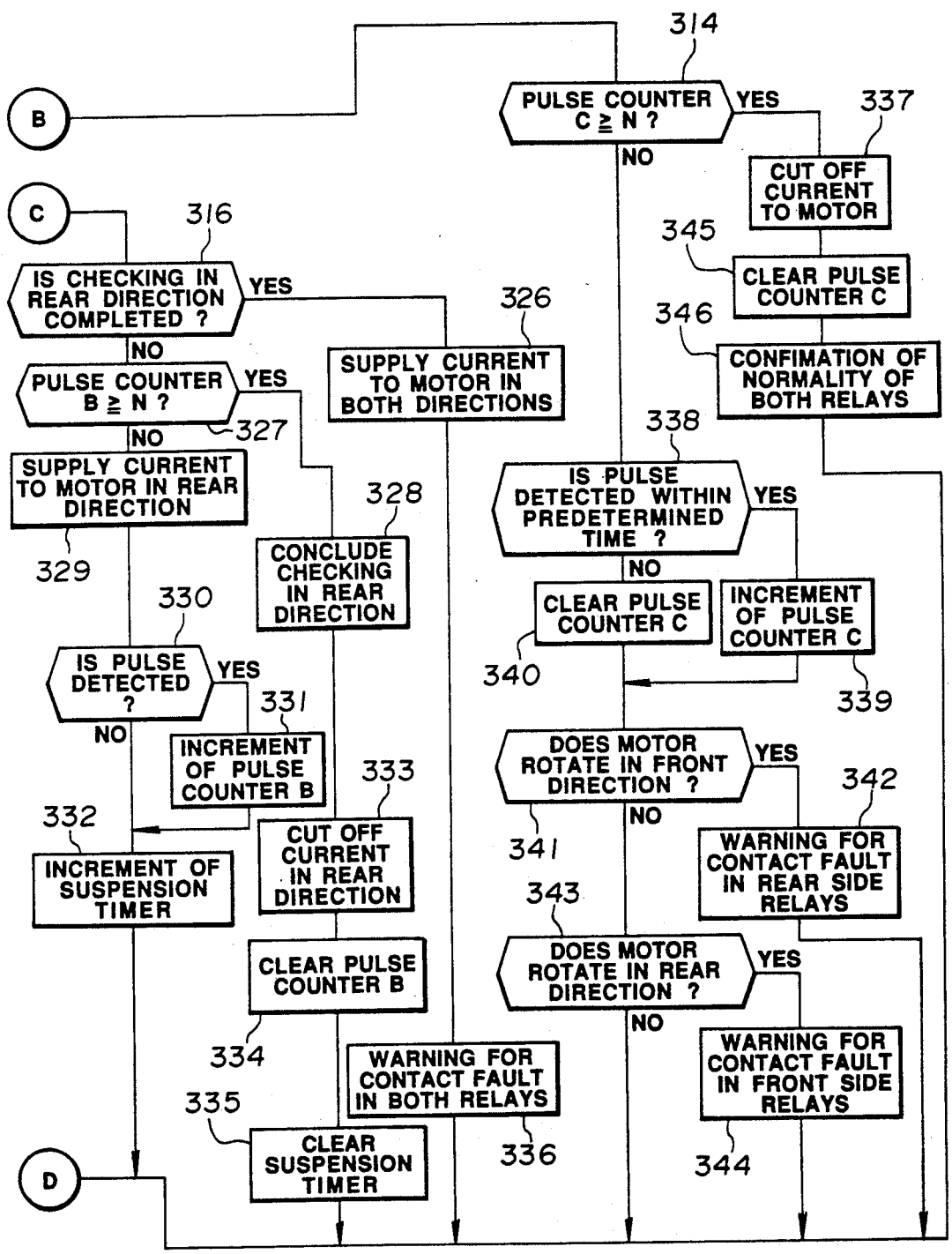
Figure 7:
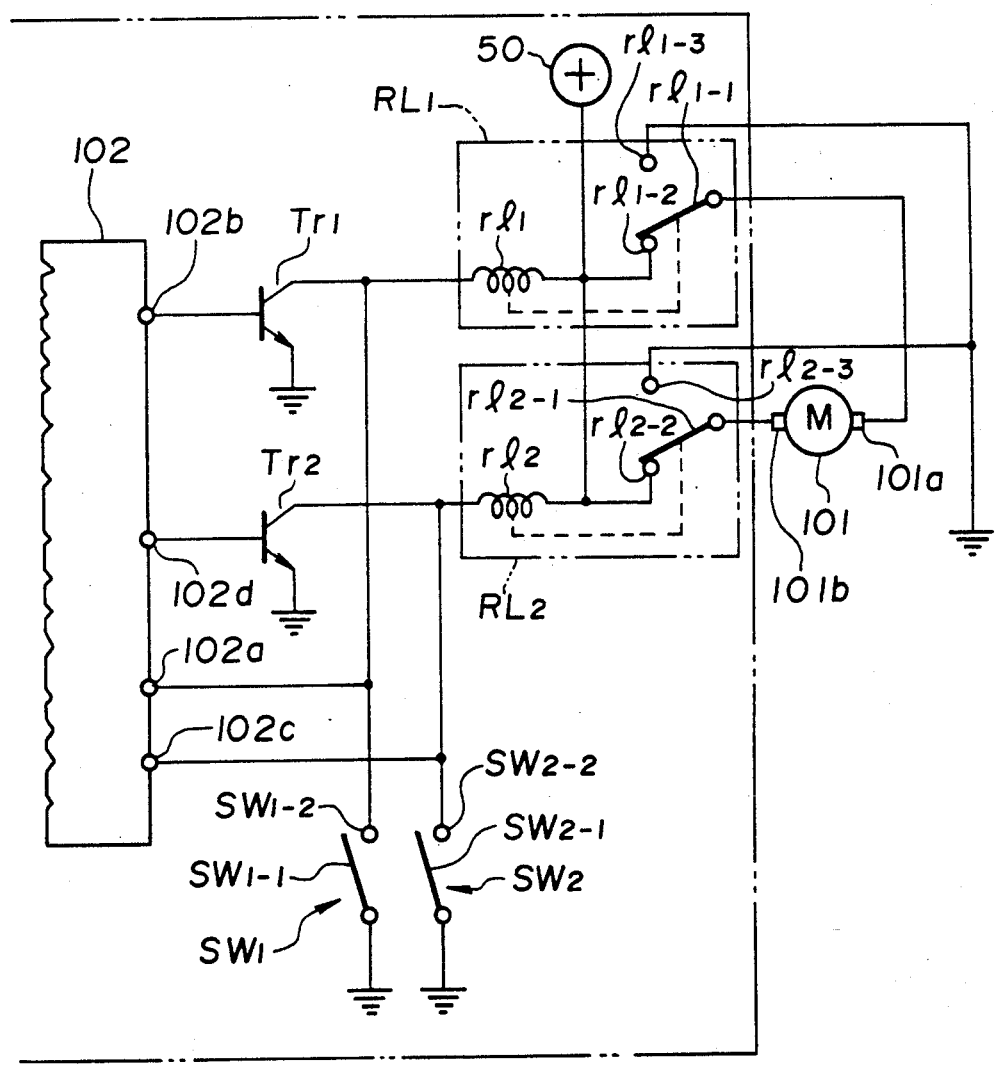
FIG. 7 is a circuit configuration of the slide-motor of the conventional power seat apparatus.

And in a case of driving the seat 2, tha control mechanism 9 excutes following control as shown in FIG. 6.

Namely, the control is started by on-operation of a power switch (not shown), judgement is done as to whether the slide-motor 3 is being driven by the memory drive means 7 or not at step 300.

In step 302 to which control proceeds by judging that the slide-motor 3 is not being driven at step 300, judgement is done as to whether the slide-motor 3 is being by the manual drive means 8. If the slide-motor 3 is being driven by the manual drive means 8 (YES), control proceeds to step 310. When the slide-motor 3 is judged not to be driven at step 302 (NO), control proceeds to succeeding step 303.

In step 301, pulse counters A, B and C of the slide-motor 3 are cleared and an inertial rotation flag is set into "1" at step 304.

In step 303, judgement is done as to whether the value of the pulse counter A of the slide-motor 3 is larger than N(constant) or not. If the value of the pulse counter A is larger than N(YES), control preceeds to step 305. When the value of the pulse counter A is not larger than N, control proceeds to step 306.

In step 306, judgement is done as to whether the inertial rotation flag F is set into "1" or not. If the flag is set into "1" (YES), control proceeds to step 307. When the intertial rotation flag F is not set into "1" (NO), control proceeds to step 308.

In step 308, judgement is done as to whether a pulse is detected within a predetermined time period or not. If the pulse is judgement to be detected within the predetermined time period (YES), the pulse counter A is added by one (increment) at step 309, and control returns to step 300. When the pulse is judged not to be detected (NO), the pulse counter A is cleared a step 310 and control returns to step 300.

In step 307 to which control proceeds by judging that the intertial rotation flag F is set into "1" at step 306, judgement is done as to whether or not inertial rotating time of the slide-motor 3 exceeds time predetermined by an inertial rotation timer. If the inertial rotating time of the slide-motor 3 exceeds the time predetermined by the inertial rotation timer (NO), the inertial rotation timer is added by one (increment) at step 311, and control returns to step 300. When the inertial rotating time is judged not to exceed the predetermined time (YES), the inertial rotation timer is cleared at step 312 and the inertial rotation flag F is set into "0" at succeeding step 313, and control returns to step 300.

In step 305 to which control proceeds by judging that the value of the pulse counter A is larger than N at step 303, judgement is done as to whether suspension time of the slide-motor 3 exceeds time predetermined by a suspension timer or not. If the suspension time of the slide-motor 3 predetermined by the suspension timer expires (YES), control proceeds to step 314. When the suspension time is judged not to expire, control exceeds to step 315.

In step 315, judgement is done as to whether checking of the slide-motor 3 in the front-directional rotation is completed or not. If the checking in the front-directional rotation is judged to be completed (YES), control proceeds to step 316. When the checking of the slide-motor 3 in the front-directional rotation is judged not to be completed (NO), control proceeds to step 317.

And in step 317, judgement is done as to whether the value of the pulse counter B of the slide-motor 3 is larger than N(constant) or not. If the value of the pulse counter B is judged to be larger than N (YES), control proceeds to step 318. When the value of the pulse counter B of the slide-motor 3 is judged not to be larger than N (NO), control proceeds to step 319.

In step 319, the slide-motor 3 is supplied with electric current in the front rotational direction, and judgement is done as to whether a pulse is detected by the rotation sensor 10 at step 320 or not.

If the pulse is detected at step 320 (YES), the pulse counter B is added by one (increment) at step 321. When the pulse is not detected at step 320 (NO), the suspension timer is added by one (increment) at step 322 and control returns to step 300.

In step 318, the checking of the slide-motor 3 in the front rotational direction is concluded, and the electric current in the front rotational direction to the slide-motor 3 is cut off at step 323 and control proceeds to step 324.

In step 324, the pulse counter B of the slide-motor 3 is cleared and control proceeds to step 325, and the suspention timer is cleared at step 325, control returns to step 300.

In step 316 to which control proceeds by judging that the checking of the slide-motor 3 in the front-directional rotation is completed at step 315, judgement is done as to whether checking of the slide-motor 3 in the rear-directional rotation is completed or not. If the checking in the rear-directional rotation is judged to be completed (YES), control proceeds to step 326. When the checking in the rear-directional rotation is judged not to be completed (NO), control proceeds to step 327.

In step 327 to which control proceeds by judging that the checking of the slide-motor 3 in the rear-directional rotation is completed at step 316, judgement is done as to whether the value of the pulse counter B is larger than N(constant) or not. If the value of the pulse counter B is judged to be larger than N (YES), the checking of the slide-motor 3 in the rear-rotational direction concluded at step 328. When the value of the pulse counter B is judged not to be larger than N (NO), electric current in the rear rotational direction is supplied to the slide-motor 3 at step 329 and control proceeds to step 330.

In step 330, judgement is done as to whether the pulse of the slide-motor 3 is detected or not. If the pulse is detected (YES), the pulse counter B is added by one (increment) at step 331 and control proceeds to step 332. When the pulse is judged not to be detected (NO) at step 330, the suspension timer is added by one (increment) and control returns to step 300.

In step 333 to which control proceeds after concluding the checking of the slide-motor 3 in the rear rotational direction at step 328, the electric current in the rear rotational direction to the slide-motor 3 is cut off and the pulse counter B of the slide-motor 3 is cleared at step 334, and control proceeds to step 335.

In step 335, the suspension timer is added by one (increment) and control returns to step 300.

In step 326, the slide-motor 3 is supplied with electric current in the front and rear rotational directions and warning is given to inform the contact faults in both relays $RL_3$ and $RL_4$ through the warning means 12 at step 336.

In step 314 to which control proceeds by judging that the suspention time predetermined by the suspention timer elapses at step 305, judgement is done as to whether the value of the pulse counter C of the slide-motor 3 is larger than N (constant) or not. If the value of the pulse counter C is larger than N(YES), electric current to the slide-motor 3 is cut off at step 337 and control proceeds to step 345. When the value of the pulse counter C is judged not to be larger than N (NO), control proceeds to step 338.

In step 338, judgement is done as to whether a pulse is detected within a predetermined time period or not. If the pulse is judged to be detected within the predetermined time period (YES), the pulse counter is added by one (increment) at step 339 and control proceeds to step 341. When the pulse is judged not to be detected within the predetermined time period (NO), the pulse counter C is cleared at step 340 and control proceeds to step 341.

In step 341, judgement is done as to whether the slide-motor 3 rotates in the front direction or not. If the slide-motor 3 is judged to rotate in the front direction (YES), warning is given to inform the contact fault in the rear side relay $RL_4$ through the warning means 12 at step 342 and control returns to step 300. When the slide-motor 3 is judged not to rotate in the front direction at step 341 (NO), control proceeds to step 343.

In step 343, judgement is done as to whether the slide-motor 3 rotates in the rear direction or not. If the slide-motor 3 is judged to rotate in the rear direction (YES), warning is given to inform the contact fault in the front side relay $RL_3$ through the warning means 12 at step 344 and control returns to step 300. When the slide-motor 3 is judged not to rotate in the rear direction at step 343 (NO), control returns to step 300.

In step 345, the pulse counter C is cleared, and the normal situation of the both relays $RL_3$ and $RL_4$ is confirmed at step 346, then control returns to step 300.

Namely, in the power seat apparatus according to this embodiment, the relays $RL_3$ and $RL_4$ are inspected at all times by repeating the aforementioned program.

As mentioned above, the power seat apparatus according to an aspect of this invention comprises a slide-motor for sliding a seat in a front or rear direction, a lift-motor for driving the seat up or down, a recliner-motor for adjusting reclining angle of a seat back of the seat, a preset memory means for storing operating data of the respective motors in response to a preset operation, a memory drive means for driving the motors according to the operating data stored in the preset memory means, a manual drive means for driving the motors according to an operation of a manual switch means, and a control mechanism for controlling the motors by processing the operating data output from the respective motors driving their inertial rotations as signals in the same directions as just before the inertial rotations of the respective motors in a case of operating the manual switch means when said motors are driven automatically by memory drive means. Therefore, there does not come out discrepancy of the memorized seat position caused by misjudgement of the rotational direction during inertial rotation. An excellent effect can be obtained since it is possible to drive the seat automatically and accurately into the position memorized suitably for the driver.

The power seat apparatus according to another aspect of this invention comprises a slide-motor for sliding a seat in a front or rear direction, a lift-motor for driving the seat up or down, a recliner-motor for adjusting a reclining angle of a seat back of the seat, a preset memory means by storing operating data of the respective motors is response to a preset operation, a memory drive means for driving the motors according to the operating data stored in the preset memory means, a manual drive means for driving the motors according to an operation of a manual switch means, a relay for changing a direction of electric current to be supplied for the respective motors, and a control mechanism for giving a warning through a warning means and controlling the motors according to a situation of the relay in a case of detecting a contact fault in the relay. Therefore, it is so designed as to give warning to inform abnormality of the relay when the contact fault is detected in the relay and as to recover the normal state as before when the contact fault in the relay is solved. Accordingly, the driver can recognize abnormality in the apparatus in advance.

What is claimed is:

1. A power seat apparatus comprising:
   a slide-motor for sliding a seat in a front or rear direction;
   a lift-motor for driving the seat up or down;
   a recliner-motor for adjusting a reclining angle of a seat back of the seat;
   a preset memory means for storing operating data of said respective motors in response to a preset operation;
   a memory drive means for driving said motors according to the operating data stored in said preset memory means;
   a manual drive means for driving said motors according to an operation of a manual switch means; and
   a control means for stopping said motors by dynamic braking if the manual switch means is operated so as to rotate the motors in one direction while said motors are driven automatically in the opposite direction by said memory drive means, for counting the operating data output from said respective motors during inertial rotations of the motors as signals in the opposite direction in which said motors have been driven automatically by said memory drive means, and for driving said motors through the manual drive means in said one direction according to the operation of said manual switch means.

2. A power seat apparatus comprising:
   a slide-motor for sliding a seat in a front or rear direction;
   a lift-motor for driving the seat up or down;
   a recliner-motor for adjusting a reclining angle of a seat back of the seat;
   a preset memory means for storing operating data of said respective motors in response to a preset operation;
   a memory drive means for driving said motors according to the operating data stored in said preset memory means;
   a manual drive means for driving said motors according to an operation of a manual switch means;
   a relay for changing a direction of electric current to be supplied for said respective motors; and
   a control means for stopping said motors by dynamic braking if the manual switch means is operated so as to rotate the motors in one direction while said motors are driven automatically in the opposite direction by said memory drive means, for counting the operating data output from said respective motors during inertial rotations of the motors as signals in the opposite direction in which said motors have been driven automatically by said memory drive means, and for driving said motors through the manual drive means in said one direction according to the operation of said manual switch means, said control means further giving a warning through a warning means and controlling the motors upon detection of a contact fault in said relay.

* * * * *